United States Patent
Soo et al.

(10) Patent No.: US 9,294,628 B2
(45) Date of Patent: Mar. 22, 2016

(54) METHOD AND APPARATUS FOR PROCESSING NETWORK ORIGINATION CALLS IN A HYBRID NETWORK

(75) Inventors: Armstrong Soo, San Francisco, CA (US); Bernard Ku, Plano, TX (US); Carol Gruchala, Naperville, IL (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 2050 days.

(21) Appl. No.: 11/428,077

(22) Filed: Jun. 30, 2006

(65) Prior Publication Data

US 2008/0002665 A1    Jan. 3, 2008

(51) Int. Cl.
*H04L 29/06* (2006.01)
*H04M 7/12* (2006.01)
*H04L 29/12* (2006.01)
*H04M 7/00* (2006.01)

(52) U.S. Cl.
CPC ......... *H04M 7/123* (2013.01); *H04L 29/12896* (2013.01); *H04L 61/106* (2013.01); *H04L 61/605* (2013.01); *H04L 65/103* (2013.01); *H04M 7/0057* (2013.01)

(58) Field of Classification Search
CPC ............ H04L 29/12896; H04L 61/106; H04L 61/605; H04L 65/103; H04M 7/0057; H04M 7/123
USPC ........................................ 379/114.21, 114.01
See application file for complete search history.

(56) References Cited

U.S. PATENT DOCUMENTS

| | | | |
|---|---|---|---|
| 6,628,921 B1 * | 9/2003 | Vaddiparty et al. | 455/12.1 |
| 6,944,276 B1 * | 9/2005 | Nguyen et al. | 379/142.02 |
| 6,947,531 B1 * | 9/2005 | Lewis et al. | 379/114.13 |
| 7,411,984 B1 * | 8/2008 | Moth et al. | 370/525 |
| 7,627,108 B1 * | 12/2009 | Enzmann et al. | 379/221.13 |
| 2002/0176550 A1 * | 11/2002 | Verbil et al. | 379/90.01 |
| 2003/0002476 A1 * | 1/2003 | Chung et al. | 370/352 |
| 2003/0137991 A1 * | 7/2003 | Doshi et al. | 370/466 |
| 2004/0176088 A1 * | 9/2004 | Sylvain | 455/433 |
| 2004/0247094 A1 * | 12/2004 | Crockett et al. | 379/88.17 |
| 2005/0078663 A1 * | 4/2005 | Sylvain | 370/352 |
| 2005/0180551 A1 * | 8/2005 | Meek et al. | 379/100.09 |
| 2005/0180552 A1 * | 8/2005 | Honda et al. | 379/114.21 |
| 2005/0286499 A1 | 12/2005 | Kobayashi et al. | |
| 2006/0013194 A1 * | 1/2006 | Baumann et al. | 370/352 |
| 2006/0083222 A1 | 4/2006 | Miyajima et al. | |
| 2006/0159253 A1 * | 7/2006 | Fink et al. | 379/265.11 |
| 2007/0189268 A1 * | 8/2007 | Mitra et al. | 370/352 |
| 2007/0297424 A1 * | 12/2007 | Xia | 370/400 |
| 2008/0282299 A1 * | 11/2008 | Koat et al. | 725/93 |

* cited by examiner

*Primary Examiner* — Khaled Kassim
(74) *Attorney, Agent, or Firm* — Guntin & Gust, PLC; Joseph Hrutka (57) ABSTRACT

A method and apparatus for processing network origination calls in a hybrid network. A system that incorporates teachings of the present disclosure may include, for example, a network management system (NMS) having a detection module to detect at a first terminal a network origination call directed to a second terminal, a search module to search a terminal type for each of the first and second terminals according to information supplied in the network origination call, and an enablement module to enable at least one media gateway to provide communication services to each of the first and second terminals identified as a circuit-switched terminal by its corresponding terminal type. Additional embodiments are disclosed.

14 Claims, 3 Drawing Sheets

METHOD AND APPARATUS FOR PROCESSING NETWORK ORIGINATION CALLS IN A HYBRID NETWORK

FIELD OF THE DISCLOSURE

The present disclosure relates generally to communication systems, and more specifically to a method and apparatus for processing network origination calls in a hybrid network.

BACKGROUND

In hybrid networks supporting Voice over IP (VoIP) and circuit-switched voice services (commonly referred to as plain old telephone service or POTS) when a VoIP terminal initiates a long distance call to a POTS terminal, it is common for a substantial portion of the voice transport between these terminals to be carried by a circuit-switched network. The same is true when a POTS terminal initiates a network origination call to a VoIP terminal. Circuit-switched calls under these circumstances can be costly and can lead to ineffective bandwidth utilization of a circuit-switched network.

A need therefore arises for a method and apparatus for processing network origination calls in a hybrid network.

DETAILED DESCRIPTION OF THE DRAWINGS

Embodiments in accordance with the present disclosure provide a method and apparatus for processing network origination calls in a hybrid network.

In a first embodiment of the present disclosure, a network management system (NMS) can have a detection module to detect at a first terminal a network origination call directed to a second terminal, a search module to search a terminal type for each of the first and second terminals according to information supplied in the network origination call, and an enablement module to enable at least one media gateway to provide communication services to each of the first and second terminals identified as a circuit-switched terminal by its corresponding terminal type.

In a second embodiment of the present disclosure, a computer-readable storage medium in an NMS can have computer instructions for detecting at a first terminal a network origination call directed to a second terminal, and enabling at least one media gateway to provide communication services to each of the first and second terminals identified as a circuit-switched terminal by its corresponding terminal type, wherein each of the terminal types is retrieved from a data source according to information supplied in the network origination call.

In a third embodiment of the present disclosure, an NMS can operate according to a method in which it enables at least one media gateway to provide communication services to at least one of first and second terminals identified as a circuit-switched terminal according to its corresponding terminal type, said terminal type retrieved from a database according to information supplied in a network origination call initiated by the first terminal.

In a fourth embodiment of the present disclosure, a media gateway can have a controller that manages a communications interface coupled to a communication system. The controller can be programmed to receive a request from an NMS to enable communications over an IP network for a first terminal identified by a telephone number mapping (ENUM) server as a circuit-switched terminal in response to a network origination call initiated by the first terminal and directed to a second terminal.

Figure 1:
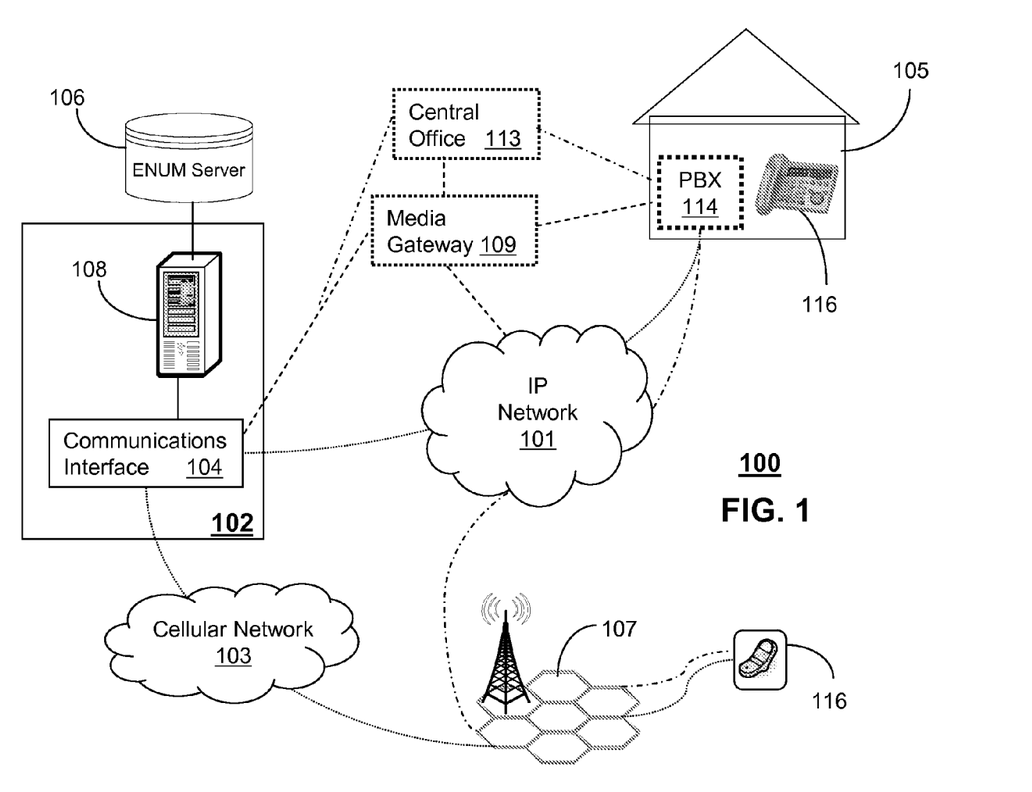
FIG. 1 depicts an exemplary embodiment of a network management system (NMS) and terminal devices communicating by way of wired and wireless access points (WAPs) with other terminal devices which collectively operate in a communication system.

FIG. 1 depicts an exemplary embodiment of a network management system (NMS) and terminal devices communicating by way of wired and wireless access points (WAPs) with other terminal devices which collectively operate in a communication system 100. The communication system 100 comprises an IP (Internet Protocol) network 101 coupled to the NMS 102, a cellular network 103 and network elements located in a building 105 representing an enterprise or residence. The IP network 101 utilizes common technology for transporting Internet traffic. For an enterprise setting, the building 105 can include a PBX 114 or interface to the IP network 101 (e.g., xDSL, Cable, satellite, etc.) that provides voice and/or video connectivity services between terminal devices 116 of enterprise personnel such as a POTS (Plain Old Telephone Service) phone terminal, a Voice over IP (VoIP) phone terminal, or video phone terminal.

In a residential setting, the building 105 can include POTS, VoIP or video phone terminals coupled to an interface to the IP network 101 or a central office 113 utilizing conventional telephonic switches for processing calls with third parties. The NMS 102 can be used to control operations of a media gateway 109, the central office 113 and the PBX 114.

Communications between the NMS 102, the terminal devices 116 and other network elements of the communication system 100 can conform to any number of signaling protocols such as signaling system 7 (SS7), session initiation protocol (SIP), or H.323.

The NMS 102 can comprise a communications interface 104 that utilizes common technology for communicating over an IP or circuit-switched interface with the IP network 101, the media gateway 109, or the cellular network 103. By way of the communications interface 104, the NMS 102 can direct by common means any of the foregoing network elements to establish circuit switched and/or packet switched connections between terminals 116 distributed throughout the communication system 100. The NMS 102 can also be coupled to a telephone number mapping (ENUM) server 106 comprising a database of end user information stored in a high capacity storage medium. Although shown separately, the ENUM server 106 can be an integral component of the NMS 102.

ENUM is an Internet Engineering Task Force or IETF Standard (RDC 3761). ENUM is a domain name service or DNS-based protocol that is best suited to offer services that expand the means to complete calls over IP networks. It provides a user with a domain name on an E.164 server in order to associate a common international telephone number with a uniform resource identifier or URI and provides other DNS-related services. DNS can be used to look up Internet addresses for services such as SIP VoIP telephony. Naming Authority Pointer or NPTR records are used for translating E.164 addresses to SIP addresses.

The NMS 102 includes a controller 108 that makes use of computing technology such as a desktop computer, or scalable server for controlling operations of the NMS 102. The NMS 102 can operate as an IP Multimedia Subsystem (IMS) conforming in part to protocols defined by standards bodies such as 3GPP (Third Generation Partnership Protocol).

Under the control of the NMS 102, the media gateway 109 can link packet-switched and circuit-switched technologies such as the cellular network 103 or central office 113 to the IP network 101, and vice-versa. The media gateway 109 can conform to a proprietary media gateway control protocol (MGCP) or an open standard such as H.248 defined in the Internet Engineering Task Force (IETF). This protocol can handle signaling and session management needed during a multimedia conference. The protocol defines a means of communication between the media gateway 109, which converts data from the format required for a circuit-switched network to that required for a packet-switched network. MGCP can therefore be used to set up, maintain, and terminate calls between disparate circuit-switched and packet-switched network elements of the communication system 100. The media gateway 109 can therefore support hybrid communication environments such as VoIP (or IP video) to POTS and vice-versa.

The cellular network 103 can support voice and data services such as GSM-GPRS, EDGE, CDMA-1X, UMTS, and other known technologies. The cellular network 103 is coupled to base stations 107 under a frequency-reuse environment for communicating over-the-air with roaming terminal devices 116.

Figure 2:
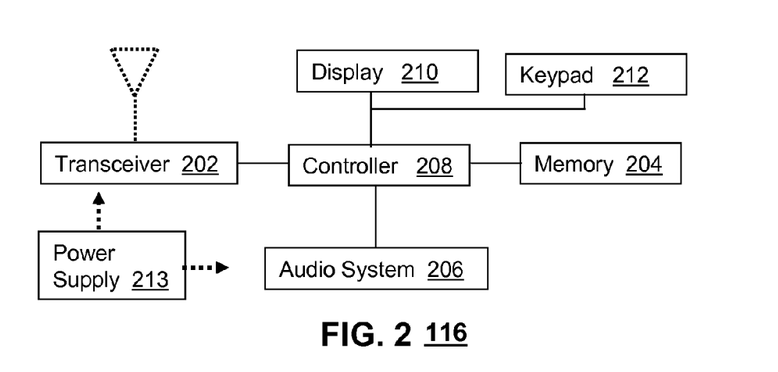
FIG. 2 depicts exemplary embodiments of the terminal device.

FIG. 2 depicts exemplary embodiments of the terminal device 116. In one embodiment, the terminal device 116 can be embodied in an immobile device (e.g., a wireline phone such as a POTS, VoIP or video terminal). In another embodiment, the terminal device 116 can include short range communications technology (e.g., a cordless phone, Bluetooth or WiFi) to support mobility within a small area such as the end user's residence. Alternatively, the terminal device 116 can represent a mobile terminal device utilizing a wireless transceiver 202 that supports long-range wireless communications such as supported by the cellular network 103. The wireless transceiver 202 of terminal device 116 utilizes technology for exchanging voice and data messages with the base stations 107, which in turn relays said messages to targeted end user terminals 116. Alternatively, the cellular network 103 can be replaced or enhanced with a network of WiMax cells. In a multimode embodiment, the terminal device 116 can utilize a transceiver 202 that supports the aforementioned wireless and wireline access technologies (e.g., POTS, WiFi, Bluetooth™, cordless, WiMax, and cellular).

Each of these embodiments of the terminal device 116 can utilize a memory 204, an audio system 206, and a controller 208. The memory 204 can comprise storage devices such as RAM, SRAM, DRAM, and/or Flash memories. The memory 204 can be an integral part of the controller 208. The audio system 206 can comprise a low volume speaker for listening to messages near the end user's ear and an associated microphone for exchanging messages with calling parties. The audio system 206 can further utilize a loud speaker for listening to announcements at a distance substantially away from the end user's ear, and as a speakerphone feature.

The controller 208 can manage the foregoing components with computing technology such as a microprocessor and/or digital signal processor. The terminal devices 116 can further include a display 210 for conveying images to the end user, a keypad 212 for manipulating operations of the communication device, and a portable power supply 213. The audio system 206, display 210, and the keypad 212 can singly or in combination represent a user interface (UI) for interfacing with the end user.

Figure 3:
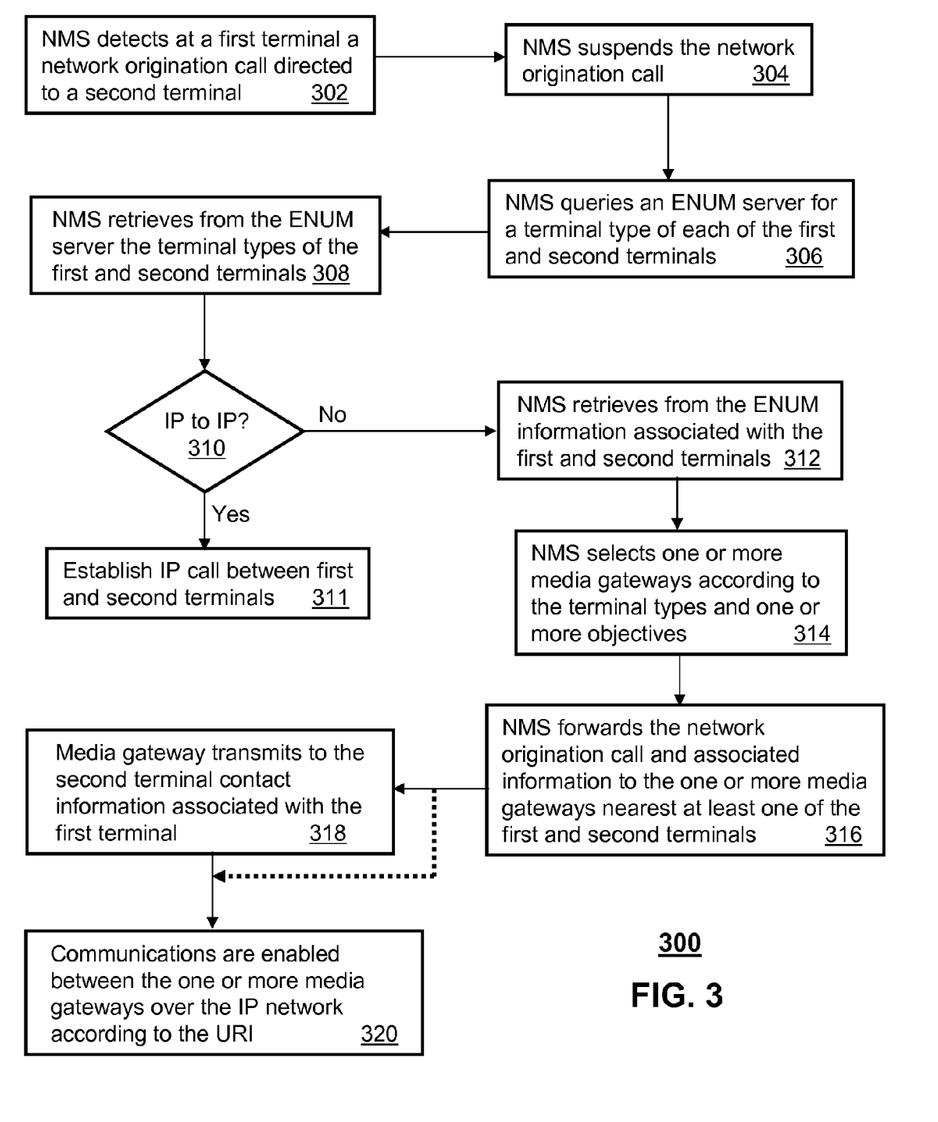
FIG. 3 depicts an exemplary method operating in portions of the communication system.

FIG. 3 depicts an exemplary method 300 operating in portions of the communication system 100. Method 300 begins with step 302 in which the NMS 102 detects at a first terminal 116 a network origination call directed to a second terminal 116. Since either of the first and second terminals 116 can be a POTS or IP terminal (i.e., VoIP or video IP terminal), the network origination call can represent any one of four possibilities:
 1. a VoIP terminal to VoIP terminal call
 2. a VoIP terminal to POTS terminal call
 3. a POTS terminal to VoIP terminal call
 4. a POTS terminal to POTS terminal call To determine the terminal type of the first and second terminals 116, the NMS 102 proceeds to step 304 where it suspends the network origination call at a timed division multiplexing (TDM) service switching point (SSP) by for example issuing an off-hook delay trigger (OHD) via an SS7 network of the communication system 100. In step 306, the NMS 102 can query the ENUM server 106 for information associated with the first and second terminals 116. The query can index a database of the ENUM server 106 according to information such as the international numbers for each of the first and second terminals 116 supplied by the network original call. Once found, the NMS 102 in step 308 can retrieve from the ENUM server 106 the terminal types of the first and second terminals 116. If in step 310 both terminals are identified as IP terminals, the NMS 102 proceeds to step 311 to establish an IP call between said terminals 116 as commonly performed in prior art end-to-end IP communications generally involving only packet-switched elements.

If on the other hand, the NMS 102 detects in step 310 that at least one of the first and second terminals 116 is a POTS terminal, NMS 102 can proceed to step 312 where it retrieves information from the ENUM server 106 associated with the first and second terminals 116. The information retrieved for the first terminal can include for example contact information such as a caller ID, email address, IM address, various contact numbers (home, cell, business, etc.). The extent to which this information is disclosed to the end user of the second terminal 116 by way of step 318 (as will be described shortly) depends on service settings established by the end user of the first terminal 116. In situations for example where the end user wants to make the call private, the NMS 102 can restrict disclosure of contact information associated with the end user of the first terminal 116.

For the second terminal 116 the information retrieved from the ENUM server 106 can include a uniform resource identifier (URI) which identifies a means for contacting the second terminal 116 by way of the IP network 101.

In step 314, the NMS 102 selects one or more media gateways 109 according to the terminal types of the first and second terminals 116 and at least one network management objective. Depending on the terminal types one or more media gateways 109 can be selected. For instance if the first terminal 116 is a POTS terminal, but the second terminal is an IP terminal, then only one media gateway 109 is selected for the first terminal. Similarly, only one media gateway 109 is selected in if the second terminal is a POTS terminal, while the first terminal 116 is an IP terminal. Two media gateways 109 are selected if the first and second terminals have a terminal type indicating they are POTS terminals.

Once it is determined whether one or two media gateways 109 are needed, the NMS 102 can strategically select the media gateways according to one or more corresponding network management objectives. For example, a first objective can be to select one or more media gateways 109 according to its proximity to the first or second terminals that are POTS terminals. A related second and third objective can be to reduce the use of circuit-switched network elements and costs incurred in the communication system 100. The service provider of the communication system 100 can define metrics for these objectives singly or in combination and can apply them to the management of the communication system 100 by way of the NMS 102.

Once the one or more media gateways 109 have been selected in step 314, the NMS 102 can proceed to step 316 where it forwards the network origination call and the information retrieved in step 312 to the one or more media gateways 109. In the case where the first terminal 116 is identified as a POTS terminal, its associated media gateway 109 can transmit in step 318 to the second terminal its contact information. If on the other hand the first terminal 116 is an IP terminal, then the first terminal can submit to the media gateway 109 of the second terminal 116 its contact information as prescribed by the end user of the first terminal 116. In the situation of private calls, step 318 can be eliminated.

In step 320, communications are enabled between the one or more media gateways 109 over the IP network 101 according to the URI of the second terminal 116. If the first terminal 116 is a POTS terminal, the media gateway 109 associated with the first terminal 116 directs a SIP server to establish communications with the second terminal 116. If the first terminal 116 is an IP terminal and the second terminal 116 is a POTS terminal, then communications over the IP network 101 is established by way of the second terminal's media gateway in direct IP communications with the first terminal.

The aforementioned embodiments of method 300 provide a means for reducing the use of long-haul circuit-switched services which can be costly in comparison to an IP network 101. It provides services providers of the communication system 100 the flexibility to optimally balance bandwidth utilization and cost of a hybrid network. It would be evident to an artisan with ordinary skill in the art that the these embodiments can be modified, reduced, or enhanced without departing from the scope and spirit of the claims described below. Accordingly, the reader is directed to the claims below for a fuller understanding of the breadth and scope of the present disclosure.

Figure 4:
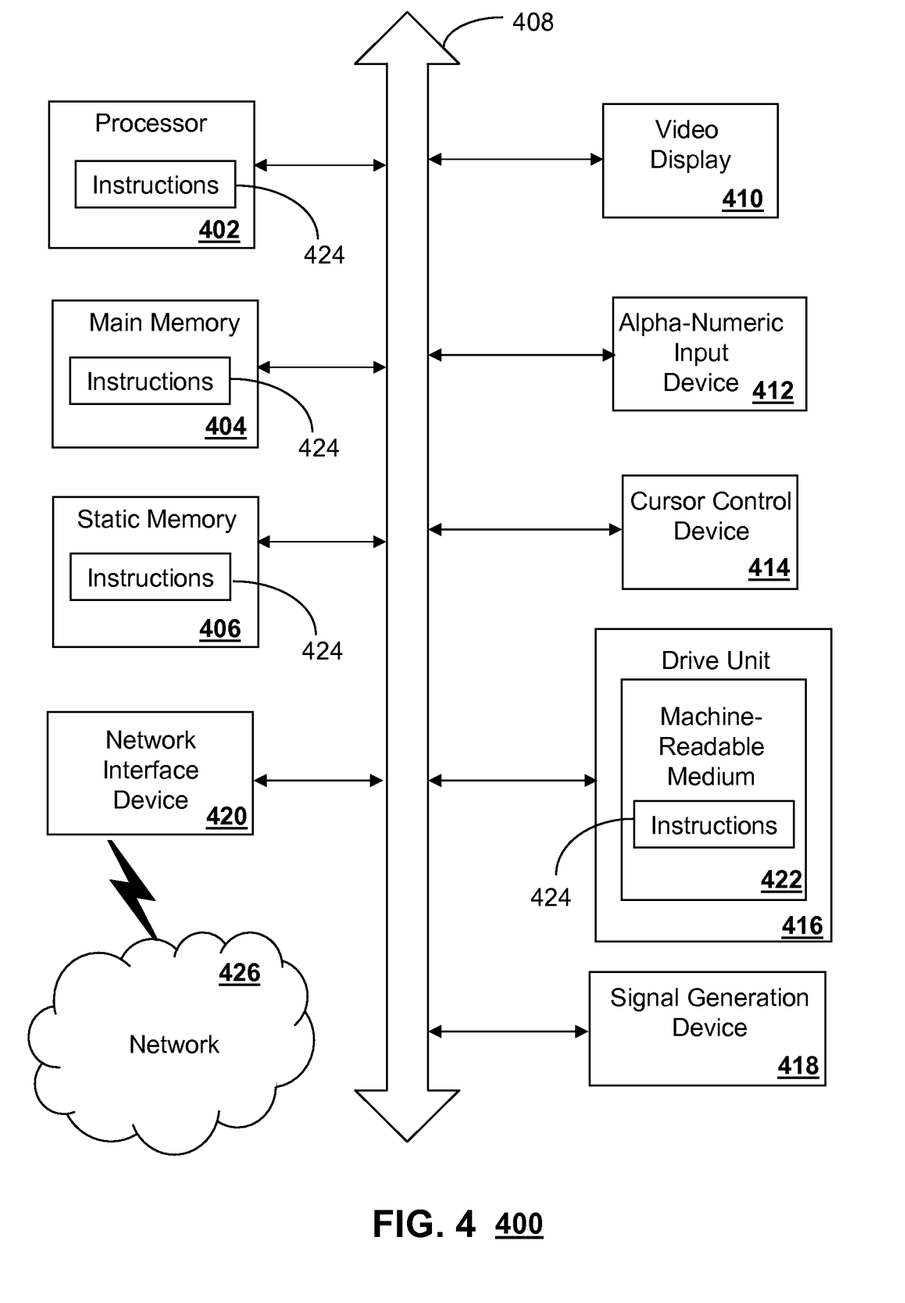
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to email or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A network management system, comprising:
a memory to store instructions; and
a processor coupled with the memory, wherein the processor, responsive to executing the instructions, performs operations comprising:
detecting at a first terminal a network origination call directed to a second terminal;
searching, at a telephone number mapping server, a terminal type for each of the first and second terminals according to information supplied in the network origination call;
suspending the network origination call at a service switching point by issuing an off-hook delay trigger from the processor via a signaling system 7 network during the searching for the terminal type at the telephone number mapping server;
retrieving from the telephone number mapping server the terminal type of each of the first and second terminals according to the information supplied in the network origination call; and
selecting selected gateways from among a group of media gateways to provide communication services to the first and second terminals, wherein the selecting the selected gateways comprises:
determining a first media gateway closest to the first terminal;
determining a second media gateway closest to the second terminal;
determining if the first terminal is a circuit-switched terminal according to the searching of the terminal type at the telephone number mapping server, and if the determining results in the first terminal being the circuit-switched terminal, selecting the first media gateway for the first terminal as one of the selected gateways and selecting the first terminal as one of a group of selected terminals; and
determining if the second terminal is a circuit-switched terminal according to the searching of the terminal type at the telephone number mapping server, and if the determining results in the second terminal being the circuit-switched terminal, selecting the second media gateway for the second terminal as one of the selected gateways and selecting the second terminal as one of the group of selected terminals;
enabling the first media gateway to provide communication services to the first terminal responsive to determining that the first terminal is the circuit-switched terminal; and
directing the first media gateway to transmit to the second terminal contact information associated with the first terminal retrieved from the telephone number mapping server, responsive to determining that the second terminal is a packet-switched terminal.

2. The network management system of claim 1, wherein the operations further comprise establishing communications between the first and second terminals by way of an IP network coupled to the selected gateways.

3. The network management system of claim 1, wherein the operations further comprise retrieving from the telephone number mapping server the terminal type of each of the first and second terminals according to the information supplied in the network origination call.

4. The network management system of claim 3, wherein the operations further comprise directing the selected gateways to transmit to the second terminal contact information associated with the first terminal retrieved from the telephone number mapping server.

5. The network management system of claim 1, wherein the selecting of the selected gateways is according to a reduction of data transport cost in a communication system.

6. A non-transitory machine-readable storage medium comprising instructions, wherein responsive to executing the instructions, a processor of a network management system performs operations comprising:
  detecting, at a first terminal, a network origination call directed to a second terminal;
  searching at a telephone number mapping server a terminal type for each of the first and second terminals according to information supplied in the network origination call;
  suspending the network origination call at a service switching point by issuing an off-hook delay trigger from the network management system via a signaling system 7 network while searching for the terminal type at the telephone number mapping server;
  retrieving from the telephone number mapping server the terminal type of each of the first and second terminals according to the information supplied in the network origination call;
  determining a first media gateway closest to the first terminal from a first group of media gateways;
  determining a second media gateway closest to the second terminal from a second group of media gateways;
  determining if the first terminal is a circuit-switched terminal according to the searching of the terminal type at the telephone number mapping server, and if the determining results in the first terminal being a circuit-switched terminal, enabling the first media gateway to provide communication services to the first terminal;
  determining if the second terminal is a circuit-switched terminal according to the searching of the terminal type at the telephone number mapping server, and if the determining results in the second terminal being a circuit-switched terminal: enabling the second media gateway to provide communication services to the second terminal; and
  directing the first media gateway to transmit to the second terminal contact information associated with the first terminal retrieved from the telephone number mapping server, responsive to determining that the second terminal is a packet-switched terminal.

7. The non-transitory machine-readable storage medium of claim 6, wherein the operations further comprise facilitating establishing communications between the first and second terminals by way of an IP network coupled to the first and second media gateways.

8. The non-transitory machine-readable storage medium of claim 6, wherein the determining of the second media gateway is according to another proximity to the second terminal.

9. The non-transitory machine-readable storage medium of claim 6, wherein the determining of the first and second media gateways is according to a reduction of utilization of circuit-switched network elements in a communication system associated with the first and second media gateways.

10. The non-transitory machine-readable storage medium of claim 6, wherein the determining of the first and second media gateways is according to a reduction of data transport cost in a communication system associated with the first and second media gateways.

11. A method, the method comprising:
  determining, by a network management system including a processor, a terminal type for first and second terminals using data in a telephone number mapping server according to information supplied in a network origination call initiated by the first terminal while the network origination call is suspended responsive to the network management system issuing an off-hook delay trigger via a signaling system 7 network while determining the terminal type at the telephone number mapping server;
  retrieving from the telephone number mapping server the terminal type of each of the first and second terminals;
  selecting, by the network management system, selected gateways from a group of media gateways to provide communication services to the first and second terminals, wherein the selecting of the selected gateways is according to a proximity to the second terminal, a reduction in use of circuit-switched network elements in a communication system, and a reduction in transport cost in the communication system, and wherein the selecting the media gateway comprises:
    determining a first media gateway closest to the first terminal;
    determining a second media gateway closest to the second terminal;
    determining if the first terminal is a circuit-switched terminal according to the retrieving of the terminal type at the telephone number mapping server, and if the determining results in the first terminal being a circuit-switched terminal, selecting the first media gateway for the first terminal as one of the selected gateways and selecting the first terminal as one of a group of selected terminals; and
    determining if the second terminal is a circuit-switched terminal according to the retrieving of the terminal type at the telephone number mapping server, and if the determining results in the second terminal being a circuit-switched terminal, selecting the second media gateway for the second terminal as one of the selected gateways and selecting the second terminal as one of the group of selected terminals;
  enabling, by the network management system, the first media gateway to provide communication services to the first terminal responsive to determining that the first terminal is the circuit-switched terminal; and
  directing the first media gateway to transmit to the second terminal contact information associated with the first terminal retrieved from the telephone number mapping server, responsive to determining that the second terminal is a packet-switched terminal.

12. The method of claim 11, comprising facilitating establishing communications between the first and second terminals by way of an IP network coupled to the selected gateways.

13. The method of claim 11, comprising:
  querying the telephone number mapping server according to information supplied in the network origination call;
  receiving a uniform resource identifier associated with the second terminal;
  forwarding the network origination call to the selected gateways; and
  facilitating enabling communications between the first and second terminals over an IP network coupled to the selected gateways according to the uniform resource identifier associated with the second terminal.

14. A media gateway, comprising:
  a communications interface that couples the media gateway to a communication system; and a controller operably coupled with the communications interface for managing operations of the communications interface, wherein the controller receives a request from a network management system to enable communications over an IP network for a first terminal identified by a telephone number mapping server as a circuit-switched terminal in response to a network origination call initiated by the first terminal and directed to a second terminal, and wherein the first terminal is identified as a circuit-switched terminal while the network origination call is suspended responsive to the network management system issuing an off-hook delay trigger via a signaling system 7 network while a terminal type is identified by the telephone number mapping server, wherein the controller retrieves from the telephone number mapping server the terminal type of each of the first and second terminals, and wherein the controller selects closest media gateways by:
determining if the first terminal is a circuit-switched terminal according to the telephone number mapping server, and if the determining results in the first terminal being a circuit-switched terminal, selecting a media gateway closest to the first terminal as a first media gateway for the first terminal; and determining if the second terminal is a circuit-switched terminal according to the telephone number mapping server, and if the determining results in the second terminal being a circuit-switched terminal, selecting a media gateway closest to the second terminal as a second media gateway for the second terminal;

enabling the first media gateway to provide communication services to the first terminal responsive to determining that the first terminal is the circuit-switched terminal; and directing the first media gateway to transmit to the second terminal contact information associated with the first terminal retrieved from the telephone number mapping server, responsive to determining that the second terminal is a packet-switched terminal.

\* \* \* \* \*

UNITED STATES PATENT AND TRADEMARK OFFICE
CERTIFICATE OF CORRECTION

| | | |
|---|---|---|
| PATENT NO. | : 9,294,628 B2 | Page 1 of 1 |
| APPLICATION NO. | : 11/428077 | |
| DATED | : March 22, 2016 | |
| INVENTOR(S) | : Armstrong Soo | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2057 days.

Signed and Sealed this
Twenty-sixth Day of July, 2016

Michelle K. Lee
*Director of the United States Patent and Trademark Office*